United States Patent

[11] 3,566,746

| [72] | Inventor | Robert R. Harrison<br>Elyria, Ohio |
|---|---|---|
| [21] | Appl. No. | 820,222 |
| [22] | Filed | Apr. 29, 1969 |
| [45] | Patented | Mar. 2, 1971 |
| [73] | Assignee | Nemo Corporation<br>Cleveland, Ohio |

[54] HYDRAULIC STEERING SYSTEM FOR BOATS
11 Claims, 4 Drawing Figs.

| [52] | U.S. Cl. | 91/6.5 |
|---|---|---|
| [51] | Int. Cl. | F04b 1/02 |
| [50] | Field of Search | 103/162, 218, 173; 230/178, 186; 91/6.5 |

[56] References Cited
UNITED STATES PATENTS

| 2,272,771 | 2/1942 | Hawley, Jr. | 103/162 |
|---|---|---|---|
| 2,661,695 | 12/1953 | Ferris | 103/162 |
| 3,116,698 | 1/1964 | Kramer | 103/162 |
| 3,457,873 | 7/1969 | Fischer et al. | 103/162 |
| 3,482,525 | 12/1969 | Bartolo et al. | 103/162 |

*Primary Examiner*—Robert M. Walker
*Attorney*—Oberlin, Maky, Donnelly & Renner

ABSTRACT: Steering system includes a pump mechanism wholly contained within the steering wheel shaft mount in front of the dash panel, with a porting plate protruding behind the mounting plate to a slight extent sufficient to provide room for connection of fittings thereto and attachment of the steering system to the dash panel.

Patented March 2, 1971
3,566,746
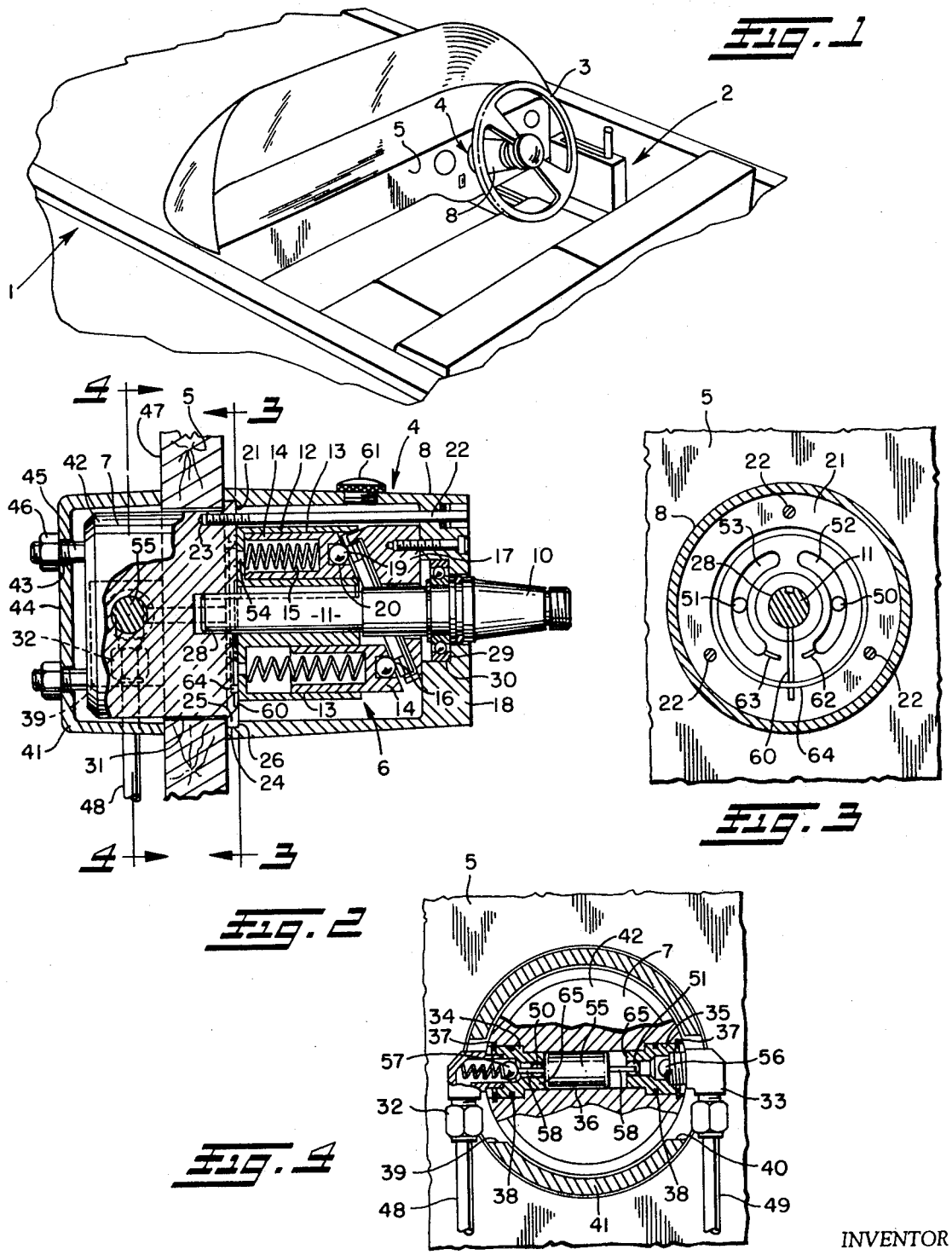
INVENTOR
ROBERT R. HARRISON
BY
Oberlin, Maky, Donnelly & Renner
ATTORNEYS

HYDRAULIC STEERING SYSTEM FOR BOATS

BACKGROUND OF THE INVENTION

The present invention relates generally as indicated to a steering system, particularly for use in controlling the movements of an outboard motor or rudder of a boat, which is more compact and requires less mounting space than previous known steering systems.

Existing steering control systems, whether of the wire, cable, or hydraulic actuated type, generally include substantial drive or pump mechanisms which ordinarily occupy a considerable amount of space behind a dash panel or other mounting support for connection to a steering column projecting through the mounting support from the front. Oftentimes, however, adequate space is not available behind the dash panel for the drive mechanism, and if modifications are made to provide the room necessary for the drive mechanism, it may be to the sacrifice of much needed seating space within the boat. Moreover, such drive mechanisms, because of their size, are often difficult to install and remove and are not readily serviceable when necessary without removing the same from behind the dash panel or mounting support.

SUMMARY OF THE INVENTION

It is accordingly a principal object of this invention to provide a steering system which is more compact and requires less mounting space behind a mounting support than previous known steering systems.

Still another object is to provide such a steering system which may be readily installed and removed and may also be serviced in place.

These and other objects of the present invention may be achieved by locating the pump mechanism of the steering system entirely within the steering wheel shaft mount in front of the mounting support so that only a portion of the porting plate need protrude behind the mounting support for the steering system, sufficient to permit connection of fittings to the valving of the steering system.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

BRIEF DESCRIPTION OF THE DRAWINGS

In the annexed drawings:

FIG. 1 is a fragmentary perspective view of a portion of a motor boat having mounted on the dashboard thereof a preferred form of steering system constructed in accordance with this invention;

FIG. 2 is a fragmentary longitudinal section through the steering system and dashboard of FIG. 1;

FIG. 3 is a transverse section through the steering wheel shaft mount of FIG. 2, taken along the front face of the porting plate on the plane of the line 3-3; and FIG. 4 is a fragmentary transverse section through the porting plate and fittings of FIG. 2, taken on the plane of the line 4-4 thereof.

DESCRIPTION OF THE PREFERRED EMBODIMENT

FIG. 1 there is illustrated a power boat 1 of typical construction including a seating compartment 2 having a steering wheel 3 operatively connected to a steering system 4 in accordance with this invention mounted on a dash panel or other suitable mounting support 5 facing the seating compartment 2. Turning of the steering wheel 3 in opposite directions cause the steering system 4 to supply hydraulic fluid under pressure in a manner to be more fully described hereafter to one or the other of a pair of fluid pressure lines leading to a slave unit of the type shown, for example, at 6 in the copending U.S. application of Robert R. Harrison, Ser. No. 702,255, filed Feb. 1, 1968, now U.S. Pat. No. 3,475,911, granted Nov. 4, 1969, which may be suitably connected to a tiller handle of a motor or other steering device as described in such copending application for controlling the movements thereof.

As clearly shown in FIG. 2, the steering system 4 consists of a pump mechanism 6 of suitable type and a porting plate 7 through which hydraulic fluid is pumped from and returned to the pump mechanism 6 as explained below. The hydraulic pump mechanism 6 is wholly contained within a cylindrical housing 8 which may be a diecasting or stamping projecting outwardly from the front side 9 of the mounting support 5 to provide a mount for the steering wheel or drive shaft 10 and shaft extension 11 enclosed by the cylindrical housing 8. Although the hydraulic pump mechanism 6 may be of any suitable design, the preferred form shown herein is of the rotary plunger type, consisting of a cylinder body 12 keyed to the shaft extension 11 for rotation therewith and having a plurality of circumferentially spaced axially extending cylinder bores 13 containing pistons 14 which are urged axially outwardly by springs 15 against the inclined face 16 of a cam or swashplate 17 bolted to the end wall 18 of the cylindrical housing 8. Ball bearings 19 may be contained in recesses 20 in the outer ends of the pistons to provide rolling engagement with the swashplate 17.

The inner end of the cylinder body 12 is maintained in sliding sealed engagement with the end face 21 of the porting plate 7 by a plurality of elongated tie rods 22 which extend from the outer wall 18 of the cylindrical housing 8 into tapped openings 23 in the porting plate and when tightened draw the porting plate toward the cylinder body. A counterbore 24 in the inner end of the cylindrical housing 8 receives a radial flange 25 on the porting plate 7 for accurately locating the porting plate 7 therein and limiting the extent of inward movement of the porting plate 7 into the cylindrical housing 8 by engagement of the flange 25 with the end wall 26 of the counterbore 24. A central recess 28 in the end face 21 of the porting plate 7 closely slidably receives the inner end of the shaft extension 11 to provide a bearing support therefor, and the shaft extension is also journaled in a roller bearing 29 contained in an opening 30 in the housing end wall 18 through which the shaft extension projects.

Referring further to FIG. 2 and also to FIGS. 3 and 4, the porting plate 7 is adapted to be received in an opening 31 in the mounting support 5 and protrudes behind the mounting support to a slight extent, sufficient to provide room for connection of fittings 32 and 33 for the fluid pressure lines 48 and 49 leading to the slave unit previously described. The inner ends of the fittings 32 and 33 have tapered threads thereon providing tight threaded engagement in check valve bodies 34 and 35 releasably retained in opposite ends of a transverse bore 36 in the porting plate 7 by snap rings 37 or the like as clearly shown in FIG. 4. Suitable seals 38 may be provided between the walls of the check valve bodies 34 and 35 and transverse bore 36 to prevent fluid leakage therepast.

The extent of protrusion of the porting plate 7 behind the mounting support 5 may be kept to the minimum by using right angle fittings 32 and 33 which extend through slots 39 and 40 in the sides of a cup-shaped element 41 surrounding the protruding portion 42. The size of the slots 39 and 40 should be sufficient to permit rotational adjustment of the fittings 32 and 33 therein as desired. Openings 43 are provided in the end wall 44 of the cup-shaped element 41 through which studs 45 project from the porting plate 7 for securing the steering system 4 to the mounting support by tightening of nuts 46 on the outer ends of the studs 45 which draws the steering system 4 toward the cup-shaped element and forces the lip of the cup-shaped element into engagement with the back side 47 of the mounting support. However, the cup-shaped element need not be removed for servicing of the pump mechanism 6 when required since removal of the tie rods 22 from the front will permit complete removal of the pump mechanism with the housing 8.

Spaced apart passages 50 and 51 in the porting plate 7 communicate with the transverse bore 36 adjacent the inner ends of the check valve bodies 34 and 35 as shown in FIG. 4 and also with arcuate grooves 52 and 53 in the end face 21 of the porting plate 7 as shown in FIG. 3. During rotation of the cylinder body 12 by the steering wheel 3, the arcuate grooves 52 and 53 will alternately communicate with the cylinder bores 13 through passages 54 in the inner end of the cylinder body 12 (see FIG. 2) for circulation of hydraulic fluid through the system as explained hereafter. The passages 50 and 51, although communicating with the same transverse bore 36 as aforesaid, are isolated from each other by a shuttle valve 55 having sliding sealed engagement in the transverse bore 36 between the passages 50 and 51 as shown in FIG. 4.

During rotation of the cylinder body 12 in one direction by turning of the steering wheel 3, as for example in a clockwise direction as viewed from the right end of FIG. 2, hydraulic fluid within the cylinder bores 13 is pumped into the groove 53 during axial inward movement of the pistons 14 by engagement with the swashplate 17 for flow through the passage 51 into the transverse bore 36 adjacent the inner end of the check valve body 35 where it acts on a check valve 56 therein to overcome the bias of a spring and unseat the check valve 56 for flow of high fluid pressure to one end of a slave unit, not shown. This same fluid pressure admitted to the right end of the transverse bore 36 as viewed in FIG. 4 urges the shuttle valve 55 to the left to unseat the other spring-biased check valve 57 contained in the check valve body 34 at the other end of the bore 36 by engagement by one of the stem portions 58 projecting from opposite ends of the shuttle valve 55 for return flow of hydraulic fluid from the slave unit through the passage 50 to the groove 52 from which the fluid is drawn into the cylinder bores 13 as the pistons 14 are moved outwardly by their associated springs 15.

Any loss of fluid from the steering system 4 is made up during rotational movement of the cylinder bores 13 past a radial groove 60 in the end face 21 of the porting plate 7 between the arcuate grooves 52 and 53 on the suction side of the pump. As clearly shown in FIG. 2, the radial groove 60 extends radially outwardly beyond the cylinder body 12 to provide communication with the interior of the cylindrical housing 8 which is used as a reservoir for makeup fluid. A cap 61 may be provided in the top of the housing 8 which is removed for filling the reservoir with hydraulic fluid. Narrow extensions 62 and 63 of the annular grooves 52 and 53 may be provided in the end face 21 of the porting plate 7 adjacent the region where the pistons 14 are fully extended as shown in FIG. 3 to prevent cavitation, and an annular groove 64 may also be provided in the end face 21 completely surrounding the arcuate grooves 52 and 53. The annular groove 64 intersects the radial groove 60 for filling by low-pressure fluid which provides additional makeup fluid to the low-pressure groove 52 or 53 by passage between the mating faces of the porting plate 7 and cylinder body 12 and also retards leakage from the high-pressure groove 52 and 53 between such mating faces.

Rotation of the cylinder body 12 by the steering wheel 3 in the reverse or counterclockwise direction causes a reversal in the flow of fluid through the arcuate grooves 52 and 53 and fluid pressure lines 48 and 49 by supplying high fluid pressure to the arcuate groove 52 which opens the check valve 57 for flow of high fluid pressure into the pressure line 48 and forces the shuttle valve 55 to the right as shown in FIG. 4 to unseat the other check valve 56 by engagement by the stem portion 58 on the other end of the shuttle valve for return flow from the slave unit through the fluid pressure line 49 to the pump 6. Projections 65 on the check valve bodies 34 and 35 act as stops limiting the movement of the shuttle valve 55 toward the check valves 56 and 57 to avoid blocking communication between the check valves and passages 50 and 51 by the shuttle valve when the check valves are opened thereby.

From the foregoing, it will now be apparent that the steering system of the present invention may be readily mounted on a dashboard or other mounting support even when there is very little space behind the dashboard, since the entire hydraulic pump mechanism is contained within a housing on the front side of the dashboard which provides a mount for the steering wheel shaft, and only a small portion of the porting plate protrudes behind the dashboard, just sufficient to provide room for the fittings which connect the steering system to fluid pressure lines leading to the device actuated thereby. In actual practice, it has been found that the porting plate need only extend between 1 to 2 inches behind the normal dashboard. Slight additional clearance will also be needed behind the dashboard for securing the steering system to the dashboard, but the pumping mechanism may be serviced from the front simply by removing the housing for the steering wheel shaft.

I claim:

1. A hydraulic steering system comprising a housing, a drive shaft extending into one end of said housing and journaled therein for rotation, a pump mechanism wholly contained within said housing, means connecting said pump mechanism to said drive shaft for actuation thereby, a porting plate for said pump mechanism secured to the other end of said housing, said porting plate having an outer diameter less than the outer diameter of said housing, and a mounting support for said steering system having an opening therein for receipt of said porting plate with said other end of said housing engaging the front side of said mounting support and said porting plate protruding a slight distance behind said mounting support to provide sufficient space therebehind for connection of fluid lines to said porting plate behind said mounting support, and means for securing said housing and porting plate to said mounting support with said other end of said housing engaging the front side of said mounting support and said porting plate protruding behind said mounting support as aforesaid.

2. The steering system of claim 1 wherein said housing has a counterbore in said other end, and said porting plate has a radial flange which is received in said counterbore for accurately locating said porting plate with respect to said housing.

3. The steering system of claim 1 wherein said means for releasably securing said housing and porting plate to said mounting support comprises a cup-shaped element surrounding the protruding portion of said porting plate, studs projecting from said protruding portion through openings in said cup-shaped element, and nuts threadedly engaging said studs for drawing said housing and porting plate toward said cup-shaped element and forcing the lip of said cup-shaped element into engagement with the back side of said mounting support.

4. The steering system of claim 3 wherein the protruding portion of said porting plate has a bore therein, and right-angle fittings are connected to the ends of said bore behind said mounting support, said cup-shaped element having slots in opposite sides thereof for extension of said fittings therethrough.

5. The steering system of claim 1 wherein said pump mechanism comprises a cylinder body keyed to said drive shaft for rotation therewith, said cylinder body having a plurality of circumferentially spaced axially extending cylinder bores open at their outer ends and having flow passages in their inner ends, an inclined swashplate fixed in said housing adjacent the open ends of said cylinder bores, pistons in said cylinder bores, spring means for urging said pistons into engagement with said swashplate, the end face of said porting plate adjacent said pump mechanism being in sliding sealed engagement with said cylinder body, a pair of arcuate grooves in said end face which alternately communicate with said cylinder bores during rotation of said cylinder body, a transverse bore in the protruding portion of said porting plate, check valves in opposite ends of said transverse bore, a pair of passages in said porting plate communicating said arcuate grooves with said transverse bore adjacent said check valves, and a shuttle valve having sliding sealed engagement in said transverse bore between said passages, said shuttle valve having stem portions projecting from the ends thereof for opening of said check valves when urged thereagainst by high-pressure fluid in the opposite end of said bore, and stop means for limiting the movement of said shuttle valve toward said check valve to avoid blocking communication between said check valves and passages by said shuttle valve.

6. The steering system of claim 1 wherein said pump mechanism comprises a cylinder body keyed to said drive shaft for rotation therewith, said cylinder body having a plurality of circumferentially spaced axially extending cylinder bores open at their outer ends and having flow passages in their inner ends, an inclined swashplate fixed in said housing adjacent the open ends of said cylinder bores, pistons in said cylinder bores, spring means urging said pistons into engagement with said swashplate, the end face of said porting plate adjacent said pump mechanism being in sliding sealed engagement with said cylinder body, a pair of arcuate grooves in said end face which alternately communicate with said cylinder bores during rotation of said cylinder body, passages in said porting plate communicating with said arcuate grooves, and a radial groove in said end face between said arcuate grooves on the suction side of said pump mechanism, said radial groove extending radially outwardly beyond said cylinder body to provide communication with the interior of said housing, said housing comprising a reservoir containing makeup fluid which is supplied to said cylinder bores during rotation past said radial groove.

7. The steering system of claim 6 further comprising an annular groove in said end face surrounding said arcuate grooves and intersecting said radial groove to provide low pressure fluid completely surrounding said arcuate grooves.

8. The steering system of claim 5 further comprising ball bearings contained in recesses in the outer ends of said pistons to provide rolling engagement with said swashplate.

9. A hydraulic steering system comprising a housing, a drive shaft extending into one end of said housing and journaled therein for rotation, a pump mechanism wholly contained within said housing, means containing said pump mechanism to said drive shaft for actuation thereby, a porting plate for said pump mechanism secured to the other end of said housing, said pump mechanism comprising a cylinder body keyed to said drive shaft for rotation therewith, said cylinder body having a plurality of circumferentially spaced axially extending cylinder bores open at their outer ends and having flow passages in their inner ends, an inclined swashplate fixed in said housing adjacent the open ends of said cylinder bores, pistons in said cylinder bores, means for urging said pistons into engagement with said swashplate, the end face of said porting plate adjacent said pump mechanism being in sliding sealed engagement with said cylinder body, a pair of arcuate grooves in said end face which alternately communicate with said cylinder bores during rotation of said cylinder body, said porting plate containing a pair of passages communicating said arcuate grooves with a bore adjacent check valves in opposite ends of said bore, and a shuttle valve having sliding sealed engagement in said bore between said passages, said shuttle valve having stem portions projecting from the ends thereof for opening of said check valves when urged thereagainst by high-pressure fluid in the opposite end of said bore, and stop means for limiting the movement of said shuttle valve toward said check valves to avoid blocking communication between said check valves and passages by said shuttle valve.

10. The steering system of claim 9 further comprising a radial groove in said end face between said arcuate grooves on the suction side of said pump mechanism, said radial groove extending radially outwardly beyond said cylinder body to provide communication with the interior of said housing, said housing comprising a reservoir containing makeup fluid which is supplied to said cylinder bores during rotation past said radial groove.

11. The steering system of claim 10 further comprising an annular groove in said end face surrounding said arcuate grooves and intersecting said radial groove to provide low pressure fluid completely surrounding said arcuate grooves.